US009819279B2

(12) United States Patent
Stewart et al.

(10) Patent No.: US 9,819,279 B2
(45) Date of Patent: Nov. 14, 2017

(54) HIGH FREQUENCY SERIES AC VOLTAGE REGULATOR

(71) Applicant: EDGE ELECTRONS LIMITED, Hong Kong (HK)

(72) Inventors: Neal George Stewart, Hong Kong (HK); Wing Ling Cheng, Hong Kong (HK)

(73) Assignee: EDGE ELECTRONS LIMITED, Sheung Wan (HK)

( * ) Notice: Subject to any disclaimer, the term of this patent is extended or adjusted under 35 U.S.C. 154(b) by 0 days.

(21) Appl. No.: 14/565,444

(22) Filed: Apr. 11, 2016

(65) Prior Publication Data

US 2016/0218635 A1 Jul. 28, 2016

Related U.S. Application Data

(60) Provisional application No. 61/913,932, filed on Dec. 10, 2013, provisional application No. 61/913,934, (Continued)

(51) Int. Cl.
*G05F 1/44* (2006.01)
*H02M 5/22* (2006.01)
(Continued)

(52) U.S. Cl.
CPC ............... *H02M 5/22* (2013.01); *G05F 1/44* (2013.01); *H02M 1/08* (2013.01); *H02M 5/293* (2013.01); *H02M 2001/0009* (2013.01)

(58) Field of Classification Search
CPC .. H02M 2001/0067–2001/008; H02M 1/4208; H02M 1/42; H02M 2001/0022;
(Continued)

(56) References Cited

U.S. PATENT DOCUMENTS 7,269,038 B2 * 9/2007 Shekhawat ............. H02M 1/42
363/71
8,791,591 B1 * 7/2014 Vinciarelli .......... H02M 3/1582
307/28
(Continued)

FOREIGN PATENT DOCUMENTS

CN 1967993 A 5/2007
CN 1967994 A 5/2007
(Continued)

OTHER PUBLICATIONS

International Search Report and Written Opinion of PCT/CN2014/093475 issued by the State Intellectual Property Office of China dated Mar. 6, 2015.
(Continued)

*Primary Examiner* — Fred E Finch, III
*Assistant Examiner* — Lorena Bruner
(74) *Attorney, Agent, or Firm* — Idea Intellectual Limited; Margaret A. Burke; Sam T. Yip

(57) ABSTRACT

An AC voltage regulator that regulates the output AC voltage level regardless of the varying AC input voltage utilizing high frequency series inductors that only process a proportion of the total output power and uses unipolar semiconductor low loss switches in series with one or more rectifiers.

18 Claims, 10 Drawing Sheets

Related U.S. Application Data filed on Dec. 10, 2013, provisional application No. 61/913,935, filed on Dec. 10, 2013, provisional application No. 62/006,900, filed on Jun. 3, 2014, provisional application No. 62/006,901, filed on Jun. 3, 2014, provisional application No. 62/006,906, filed on Jun. 3, 2014.

(51) Int. Cl.
| | | |
|---|---|---|
| *H02M 5/293* | (2006.01) | |
| *H02M 1/08* | (2006.01) | |
| *H02M 1/00* | (2006.01) | |

(58) Field of Classification Search
CPC ........ H02M 3/1582; H02M 1/08; H02M 5/22; H02M 5/293; H02M 2001/0009; G05F 1/44
USPC .................................. 323/282, 285, 290, 271
See application file for complete search history.

(56) References Cited

U.S. PATENT DOCUMENTS

| | | | |
|---|---|---|---|
| 9,114,281 B2* | 8/2015 | Divan | H02M 1/34 |
| 2007/0052397 A1 | 3/2007 | Thompson et al. | |
| 2011/0221402 A1* | 9/2011 | Park | G05F 1/70 |
| | | | 323/211 |
| 2014/0153298 A1* | 6/2014 | Kazanbas | H02M 7/538 |
| | | | 363/37 |

FOREIGN PATENT DOCUMENTS

| | | |
|---|---|---|
| CN | 103078495 A | 5/2013 |
| WO | 2012/137210 A2 | 10/2012 |

OTHER PUBLICATIONS

European Search Report of 14868867.4 dated May 29, 2017.

\* cited by examiner

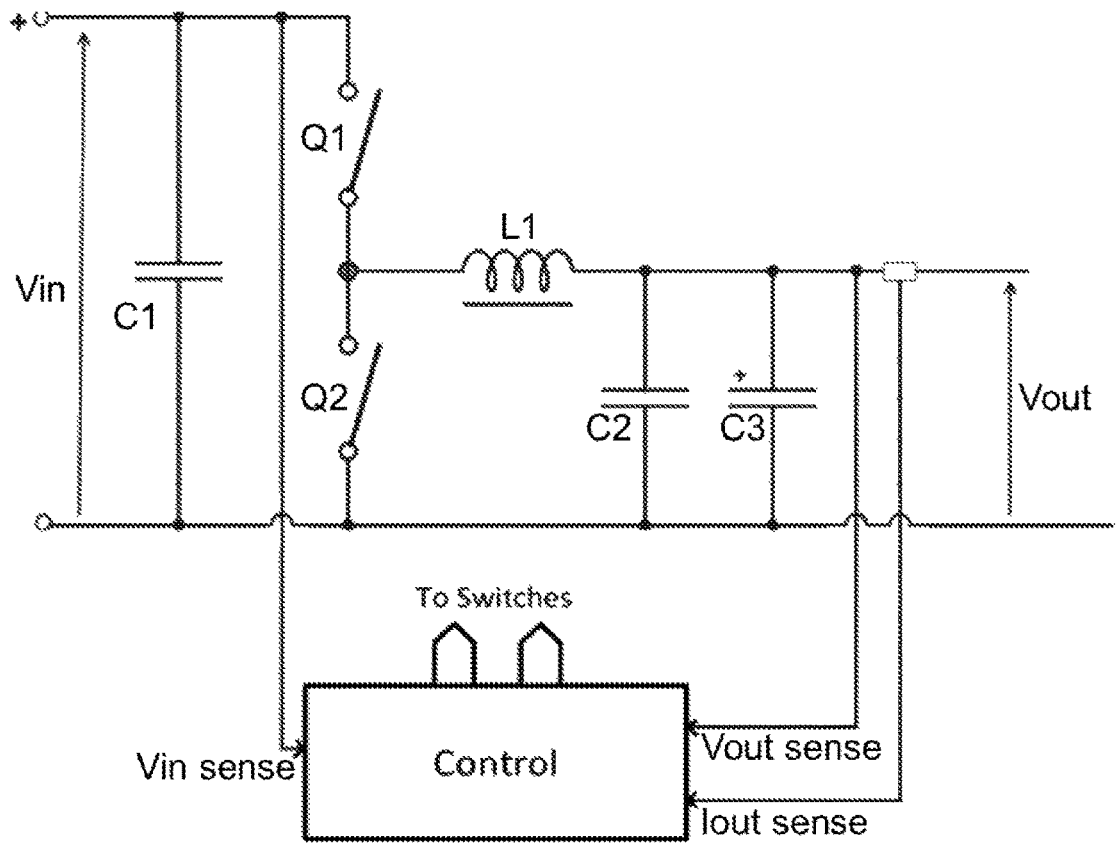
FIG. 1a – Prior Art --

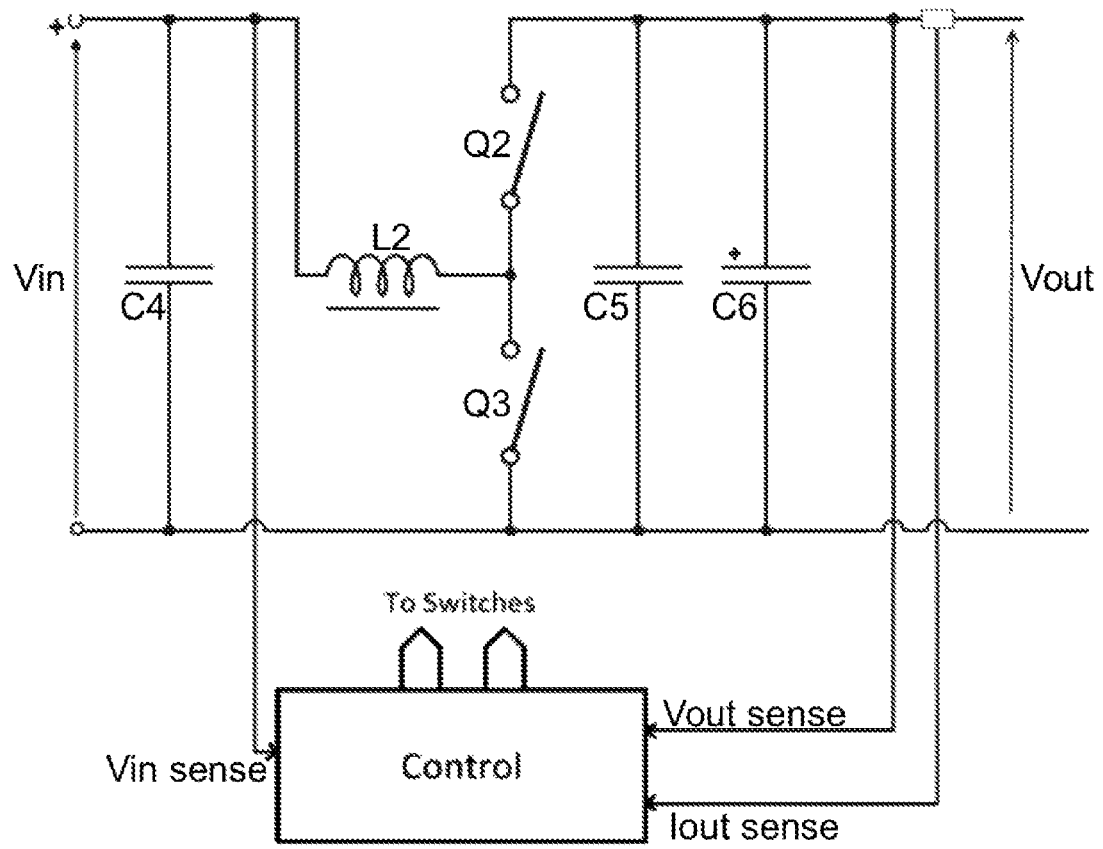
FIG. 1b – Prior Art --

HIGH FREQUENCY SERIES AC VOLTAGE REGULATOR

CLAIM FOR DOMESTIC PRIORITY

This application claims priority under 35 U.S.C. §119 to the U.S. Provisional Patent Application No. 61/913,932, filed Dec. 10, 2013, U.S. Provisional Patent Application No. 61/913,934, filed Dec. 10, 2013, United States Provisional Patent Application No. 61/913,935, filed Dec. 10, 2013, U.S. Provisional Patent Application No. 62/006,900, filed Jun. 3, 2014, U.S. Provisional Patent Application No. 62/006,901, filed Jun. 3, 2014, and U.S. Provisional Patent Application No. 62/006,906, filed Jun. 3, 2014, the disclosures of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to power electronics. Particularly, the present invention relates to methods and power electronics for regulating alternative current (AC) voltage, and more particularly regulating an output AC voltage to a desired level regardless of the variation in an input AC voltage.

BACKGROUND

AC voltage regulators are used to closely control and regulate the AC voltage level being delivered to a load connected to the output of the AC voltage regulator, regardless of the AC voltage variation at the input of the AC voltage regulator.

This has been traditionally done by various low frequency (LF), typically at 50 or 60 Hz, or other frequencies, electrical mains magnetic structures. These structures are typically tapped at specific discrete transformer voltage taps in various transformers or transformer configurations. Nonetheless, all these structures rely on traditional AC switching devices such as relays or semiconductor devices such as silicon-controlled rectifiers (SCR)'s or gate turn off thyristor (GTO)'s connected as anti-parallel AC switches, TRIAC's, AC switches such as insulated-gate bipolar transistors (IGBT)'s, MOSFET transistors, and SCR's configured as AC switches, e.g. connected between rectifiers. These AC switches are selected and activated by the electronic control circuit to automatically switch the selected magnetic transformer structure tap, in turn adjusting the transformer or transformer configuration turns ratio to control the AC output voltage as close as possible to the desired level.

Another traditional method to regulate an output AC voltage is to use an electro-mechanically-adjusted auto-transformer that is driven by electrical mechanical means, such as a controlled electrical motor. The electronic control in this case senses the input voltage and then drives the electro-mechanical means to move the output contact to adjust the turns of the auto-transformer, in turn sets the correct turns ratio to fix the output AC voltage to the desired level. These electro-mechanically-adjusted auto-transformer devices are also LF magnetic structures, typically at 50 Hz or 60 Hz, or other frequencies, and generally use carbon brushes to make the moving electrical contact to the auto-transformer windings. These brushes, however, undergo mechanical wear as such they need frequent maintenance and replacement.

A more sophisticated fully electronic version utilizes again LF mains transformers, typically at 50 Hz or 60 Hz, or other frequencies, connected in series between the AC input and the AC output of the voltage regulator. As the input AC voltage level varies, the AC voltage regulator electronic control senses the input voltage level, and then sets up an in-phase positive or an in-phase negative differential AC voltage that adds or subtracts, to or from, the varying input AC voltage to maintain the output AC voltage to the desired set level. This traditional approach, in its various forms, still uses LF mains frequency transformers or LF magnetic structures, typically at 50 Hz or 60 Hz, or other frequencies. In one configuration, the power electronics generates a LF mains frequency to correct the input AC voltage by a high frequency pulse width modulation (HF PWM) means, and this in-phase correction voltage to adjust the input AC mains voltage, is applied to the primary of the LF transformer, with the secondary of the LF transformer connected in series between the input and output of the AC power line. But still the magnetic structures used in these configurations, even though the power electronics operate at higher PWM frequencies, the final differential AC waveform is still applied to the LF series transformer, typically at 50 Hz or 60 Hz, or other frequencies, hence the LF transformer or magnetic structures still have the disadvantage of size and weight.

The voltage regulator disclosed in U.S. patent application Ser. No. 14/525,230 (the disclosure of which is incorporated herein by reference in its entirety) also addresses the disadvantages of the traditional designs in using series low mains frequency, large, and heavy magnetic structures. Since the size of any magnetics is largely inversely proportional to its operating frequency, the present invention approaches with this as a central design parameter. The aim of the '230 voltage regulator is to achieve a unique AC voltage regulator topology that utilizes only HF (e.g. 1 KHz to 1000 kHz) series magnetic structures that reduce significantly the size, weight, and cost of these magnetic structures. The '230 voltage regulator, however, uses bidirectional AC switches that exhibit additional losses.

SUMMARY

Disclosed herein is an improved voltage regulator topology over the topology of the AC buck-boost voltage regulator disclosed in U.S. patent application Ser. No. 14/525,230. Instead of using unipolar switches connected as AC switches, one embodiment of the present invention splits the AC inductor current path in the buck and boost sections into two unipolar paths. In this embodiment, in the buck section, the two unipolar paths are represented by two diode connected as half-bridge branches, each responsible for the conduction of unipolar current. One half-bridge branch conducts current in one direction and other branch conducts current in the opposite direction. Inductors in the two half-bridge branches are coupled inductors having identical number of turns for symmetry reason. The total output current, having the waveform of a typical buck converter is the sum of currents of the two branches. The voltage regulation, again take the buck section as example, is controlled by conventional PWM method. The AC output voltage is linearly proportional to the duty cycle of the forward switches.

The AC output current is split into two unipolar paths as determined by the topology switch and diode directions. There is a small circulation current build-up in the two paths, which is a small fraction of the full-load current and does not increase as the load current increases. The instantaneous ripple current direction reversal near output current zero-crossing is the sum of the circulation current ripple which is automatically handled by the topology. The amount of circulation current at specific operating voltage is function of the PWM overlapping period and leakage inductance of the coupled inductors.

The AC current output current can be in any phase relationship relative to the input and output voltage. For this reason, this AC regulator topology is capable of operating in all four possible quadrants of the AC voltage and current cycle. The topology can handle any power factor and bidirectional power flow without the need of an intermediate DC link. Due to the inherent unipolar nature of individual switching branches. The diode series connected half bridge branches are shoot-through proof. This topology does not require accurate voltage and current polarity sensing to operate, the simple PWM relationship makes this topology very robust to power line voltage and current perturbation.

BRIEF DESCRIPTION OF THE DRAWINGS

Embodiments of the invention are described in more detail hereinafter with reference to the drawings, in which FIG. 1a depicts a circuit diagram of an embodiment of a conventional buck convertor;

FIG. 1b depicts a circuit diagram of an embodiment of a conventional boost convertor;

DETAILED DESCRIPTION

In the following description, methods, systems, and apparatuses for regulating an output AC voltage to a desired level regardless of the variation in an input AC voltage and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Referring to FIG. 1. FIG. 1a is a conventional non-isolated two switches DC-DC step down buck converter with a series HF inductor L1. Capacitor C3 is a charge storage capacitor to smooth out the switching current pulses, and capacitors C1 and C2 are HF bypass capacitors that are optional depending upon the voltage source, operating frequency, and components used. FIG. 1b is a conventional non-isolated 2 switches DC-DC step up boost converter with a series HF inductor L2. Capacitor C6 is a charge storage capacitor to smooth out the switching current pulses, and capacitors C4 and C5 are HF bypass capacitors that are optional depending upon the voltage source, operating frequency, and components used. FIG. 1a and FIG. 1b are DC-DC Buck and Boost converters respectively with positive voltage input and outputs. It is to be noted, that any ordinarily skilled person in the art can construct similar DC-DC Buck and Boost converters respectively with negative or positive voltage input and outputs.

Figure 2A:
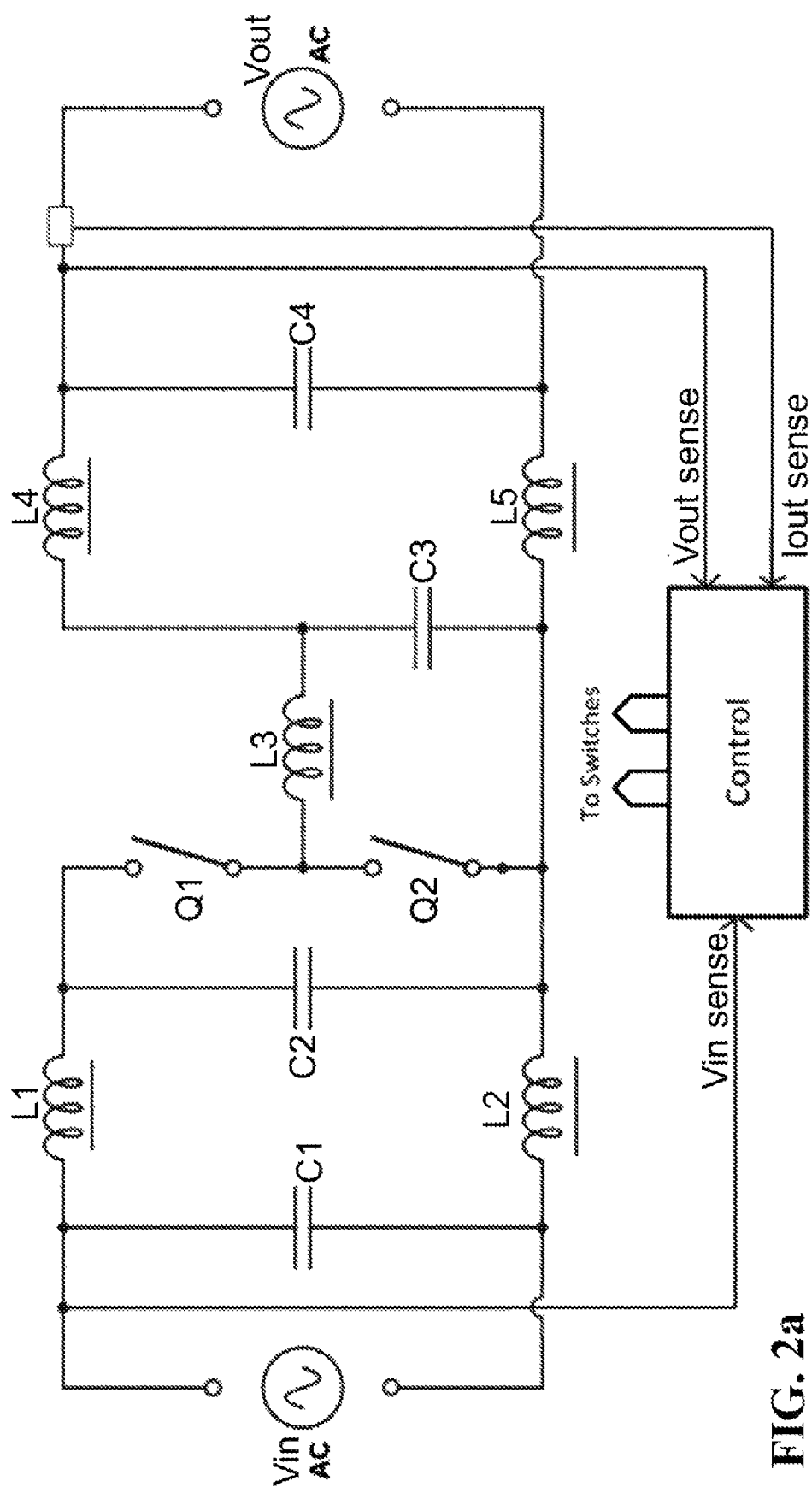
FIG. 2a depicts a circuit diagram of an embodiment of a HF AC series buck convertor with bidirectional AC semiconductor.

Referring to FIG. 2. FIG. 2a is an AC buck convertor with bidirectional switching devices. Q1 and Q2 in FIG. 1a are changed to bidirectional AC switches Q1 and Q2 in FIG. 2a. Also in FIG. 2a, the output unipolar electrolyte capacitor C3 in FIG. 1a is changed to a HF filter AC capacitor C4. In addition, the HF filter components are added to suppress and filter the HF (e.g. 1 KHz-1,000 KHz) switching frequency on the input and output. Filter inductors L1 and L2 with filter bypass capacitors C1 and C2 on the input, and filter inductors L4 and L5 with filter bypass capacitors C3 and C4 on the output. Capacitors C1 and C4 are optional depending on the components used and operating frequency.

In FIG. 2a, inductor L3 is a power inductor that is designed to operate at HF (e.g. 1 KHz to 1,000 KHz). Since the AC switching devices Q1 and Q2 are switching at HF (e.g. 1 KHz to 1000 KHz) under electronic control either through analogue circuitry or digital control circuitry with DSP or microprocessor signal processing, and the outputs from the control electronics driving the AC semiconductor devices with HF (e.g. 1 KHz to 1000 KHz) modulated PWM modulation, and at each HF point along the LF mains AC voltage input (typically at 50 Hz or 60 Hz, or other frequencies), the control electronics generates a specific pulse wide enough to drive AC switches Q1 and Q2 to generate a negative differential voltage in combination with power inductor L3, hence bucking and regulating the output voltage at each point along the input AC voltage to the desired value set by the internal control reference.

For example, if the control is switching at a design frequency of 25,000 Hz, then every 40 microseconds the amplitude of the input mains LF voltage, typically at 50 Hz or 60 Hz, or other frequencies, is bucked and decreased at that point, against the set internal voltage reference. Therefore, every 40 microseconds the circuit bucks the input AC voltage to adjust and regulate the desired set output AC voltage. The input filter comprising capacitors C1 and C2, and filter inductors L1 and L2. The output filter comprising capacitors C3 and C4, and filter inductors L4 and L5, or various combinations of HF filter elements can be used to filter and bypass the HF switching frequencies of the AC bidirectional semiconductor switches, switching at HF, such as in this exemplary embodiment, at 25,000 Hz.

Figure 2B:
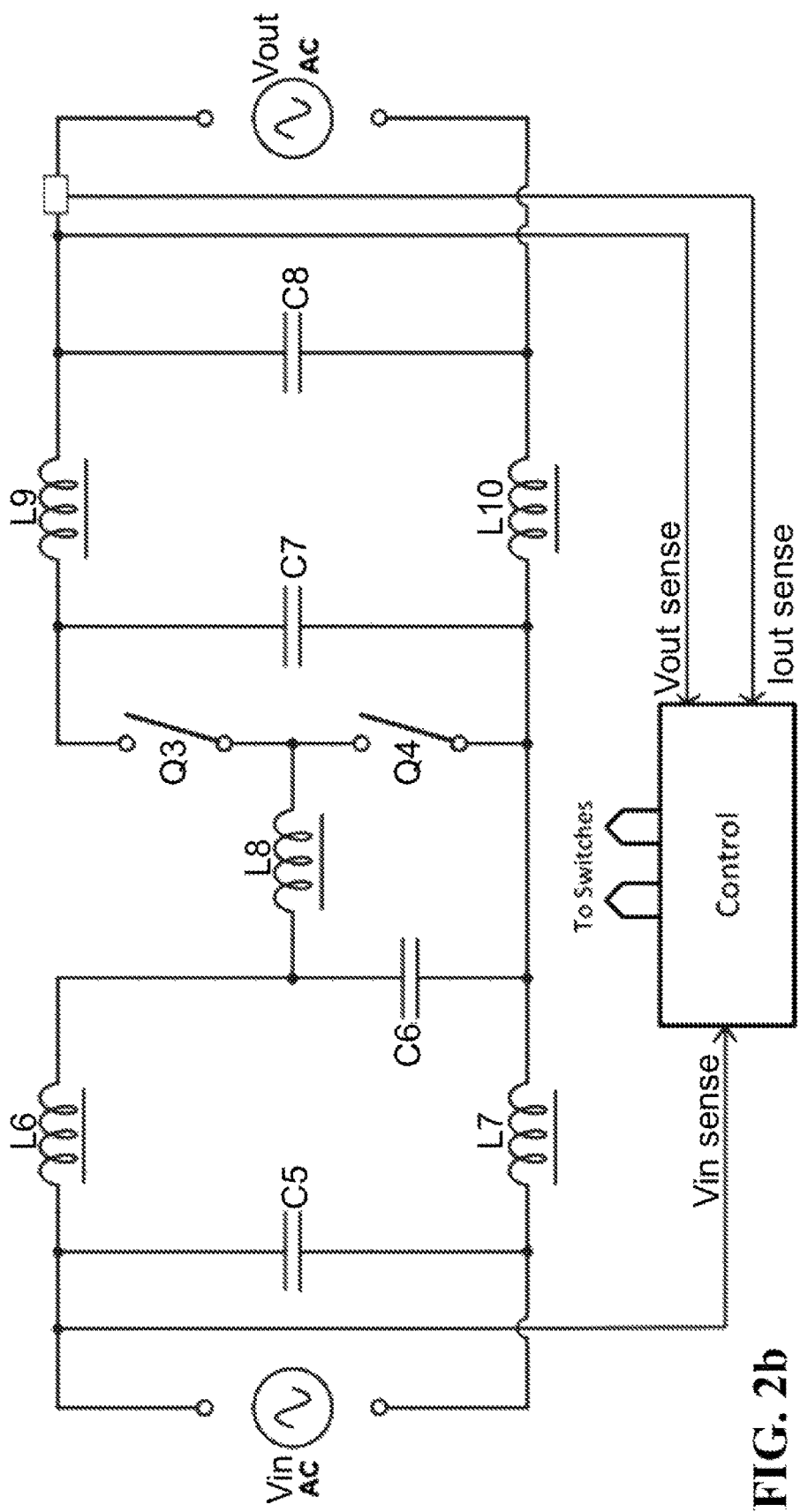
FIG. 2b depicts a circuit diagram of an embodiment of a HF AC series boost convertor with bidirectional AC semiconductor.

FIG. 2b is an AC boost convertor with the bidirectional switching devices. Q1 and Q2 in FIG. 1b are changed to bidirectional AC switches Q3 and Q4 in FIG. 2b. Also in FIG. 2b, the output unipolar electrolyte capacitor C6 in FIG. 1b is changed to a HF filter AC capacitor C8. In addition, HF filter components are added to suppress and filter the HF (e.g. 1 KHz-1,000 KHz) switching frequency on the input and output. Filter inductors L6 and L7 with filter bypass capacitors C5 and C6 on the input, and filter inductors L9 and L10 with filter bypass capacitors C7 and C8 on the output. Capacitors C5 and C8 are optional depending on the components used and operating frequency.

In FIG. 2b, inductor L8 is a power inductor that is designed to operate at HF (e.g. 1 KHz to 1,000 KHz). Since AC switching devices Q3 and Q4 are switching at HF (e.g. 1 KHz to 1,000 KHz) under electronic control either through analogue circuitry, but typically digital control circuitry with DSP or microprocessor signal processing, and the outputs from the control electronics drive the AC semiconductor devices with HF (e.g. 1 KHz to 1,000 KHz) modulated PWM modulation, and at each HF point along the LF mains AC voltage input, typically at 50 Hz or 60 Hz, or other frequencies, the control electronics generates a specific pulse of width enough to drive AC switches Q1 and Q2 to generate a positive differential voltage in combination with power inductor L3, hence boosting and regulating the output voltage at each point along the input AC voltage to the desired value set by the control reference.

For example, if the control is switching at a design frequency of 25,000 Hz, then every 40 microseconds the amplitude of the input mains LF voltage, typically at 50 Hz or 60 Hz, or other frequencies, is boosted and increased at that point against the set internal voltage reference. Therefore, every 40 microseconds the control circuit driving the semiconductor bidirectional AC switches Q3 and Q4, with power inductor L8, boosts the input AC voltage to adjust and regulate the desired set output AC voltage. The input filter comprising capacitors C5 and C6, and filter inductors L6 and L7. The output filter comprising capacitors C7 and C8, and filter inductors L9 and L10, or various combinations of HF filter elements can be used to filter and bypass the HF switching frequencies of the AC bidirectional semiconductor switches, switching at HF, such as in this exemplary embodiment, at 25,000 Hz.

Figure 3:
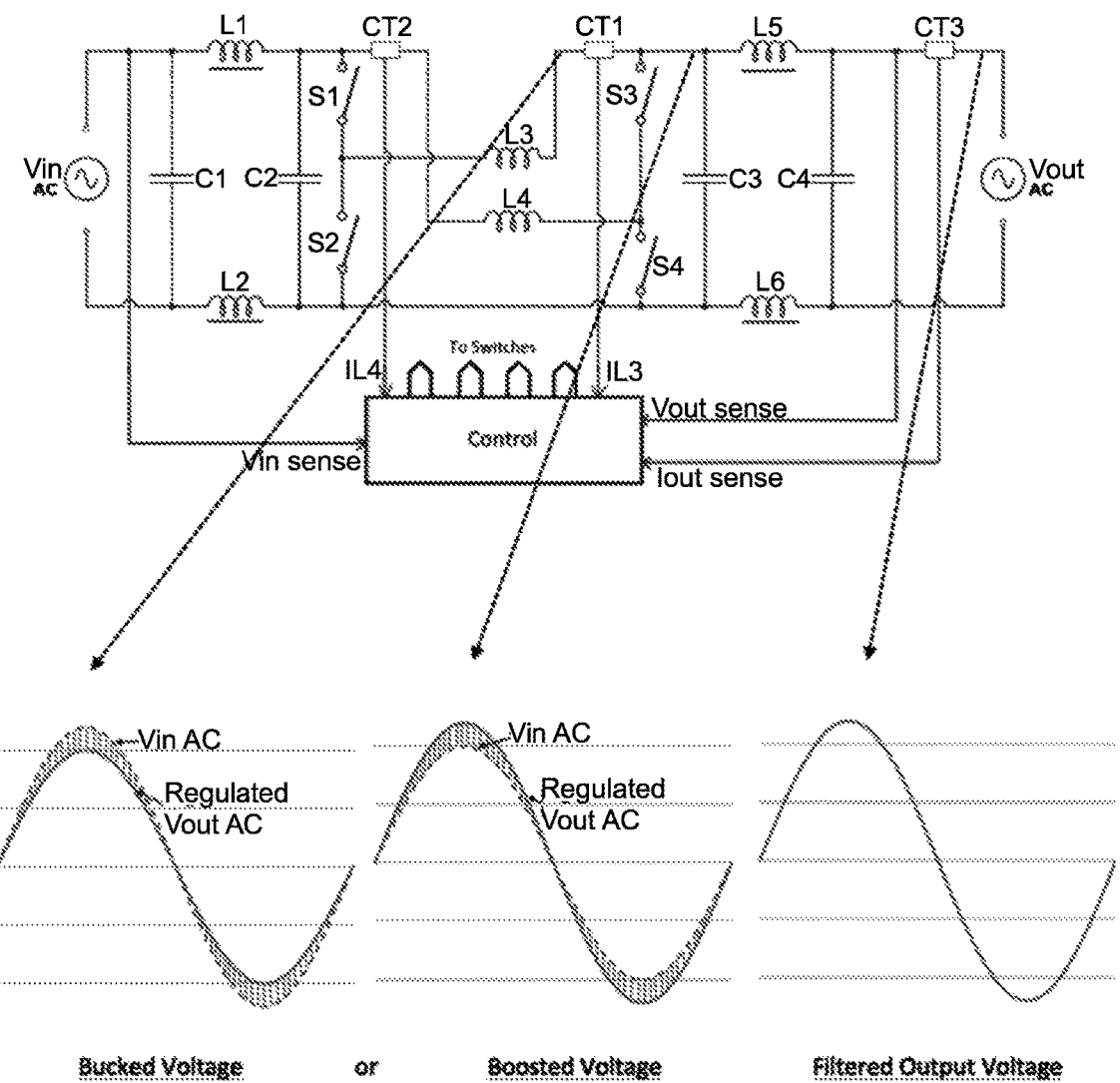
FIG. 3 depicts a circuit diagram of an embodiment of a HF AC series buck-boost voltage regulator.

Any ordinarily skilled person in the art can use an individual buck AC voltage regulator section, such as that shown in FIG. 2a, as a series AC buck voltage regulator; an individual boost AC voltage regulator section, such as that shown in FIG. 2b, as a series AC boost voltage regulator; or combine the buck AC voltage convertor from FIG. 2a with the boost AC voltage regulator from FIG. 2b to form a complete HF AC voltage regulator is shown in FIG. 3.

FIG. 3 shows the basic operating principles of a complete HF AC voltage regulator that can buck or boost the AC input voltage at each HF point. For example, if the operating frequency of the AC voltage regulator is selected to be 25 KHz, then the input voltage is sensed by the electronic analogue or digital control and compared to an internal reference, and then the AC bidirectional switches are driven under control to buck (reduce) or boost (increase) the AC input voltage. The voltage is adjusted at each 40 microsecond point through each LF mains voltage cycle, typically at 50 Hz or 60 Hz, or other frequencies, under analogue or digital electronic control with reference to an internal voltage level is able to regulate the AC output voltage to the desired set level. This is shown in FIG. 3 with the waveforms showing the HF PWM bucking or boosting the input AC voltage, and the output AC voltage being filtered by the filter components to eliminate the HF switching pulses.

Still referring to FIG. 3. This HF buck-boost AC voltage regulator utilizes HF power inductors (e.g. 1 KHz-1,000 KHz) L3 and L4, in combination with AC bidirectional semiconductor switches Q1, Q2, Q3, and Q4, that are driven by an electronic control circuit to create a unique topology that can increase or decrease the input AC voltage to regulate the AC output voltage to a set desired level. So at each HF PWM interval (for example 40 microsecond PWM intervals at 25 KHz) the input voltage in bucked (reduced) or a boosted (increased) under HF switch control that generates the correct PWM drive signal to the AC switches at each HF point on the mains low frequency, typically at 50 Hz or 60 Hz, or other frequencies, to buck or boost and correct the input AC voltage level, against a desired set output AC voltage in the control electronics. Also, this HF series buck-boost AC voltage regulator only has to process the differential power across the buck and boost inductors, L3 and L4, to regulate the input to out AC voltage, so this is much less power than the total output power because of the configuration. The buck and boost inductance only has to handle the power required to adjust the differential input AC voltages to regulate the output AC voltage to the desired set level.

Figure 4:
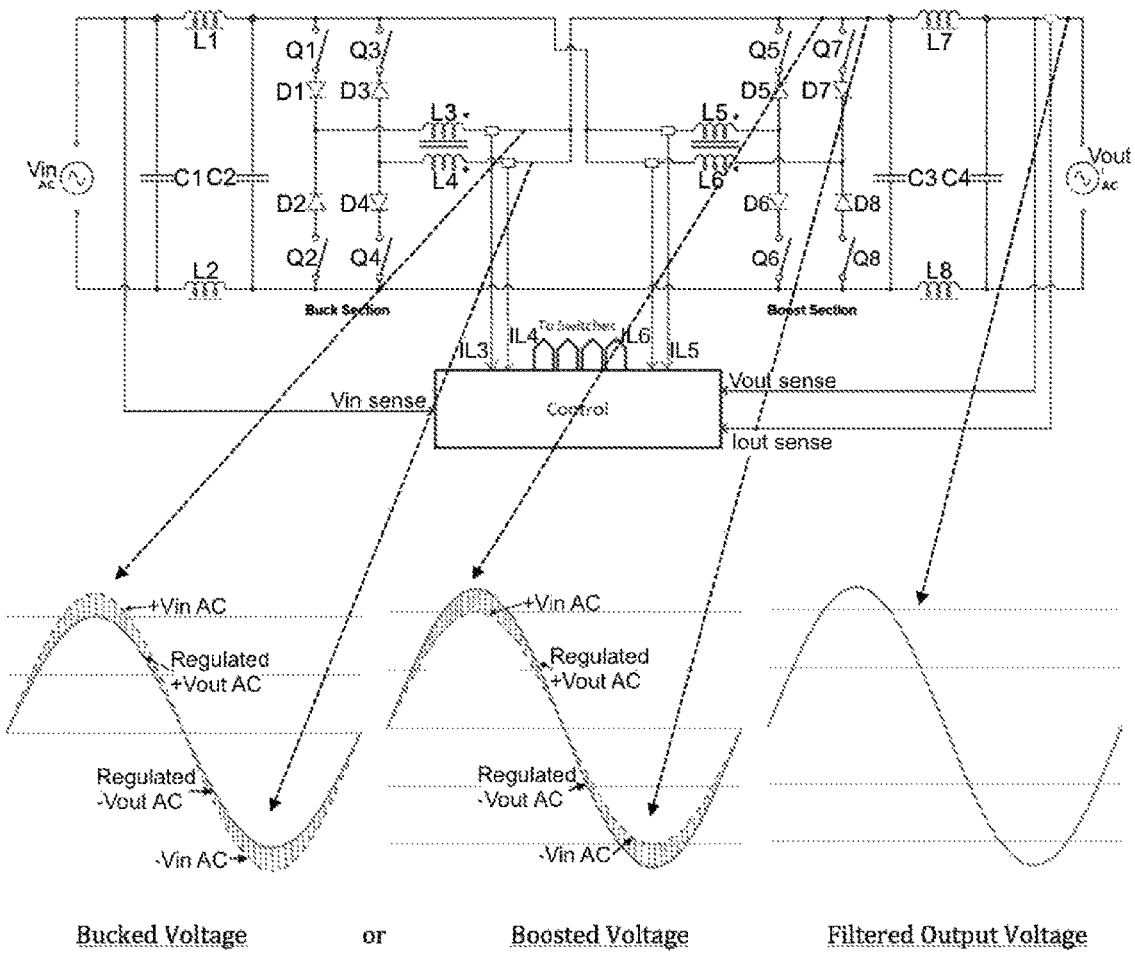
FIG. 4 depicts a circuit diagram of an embodiment of an improved HF AC series buck-boost voltage regulator in accordance to the present invention.
Figure 5A:
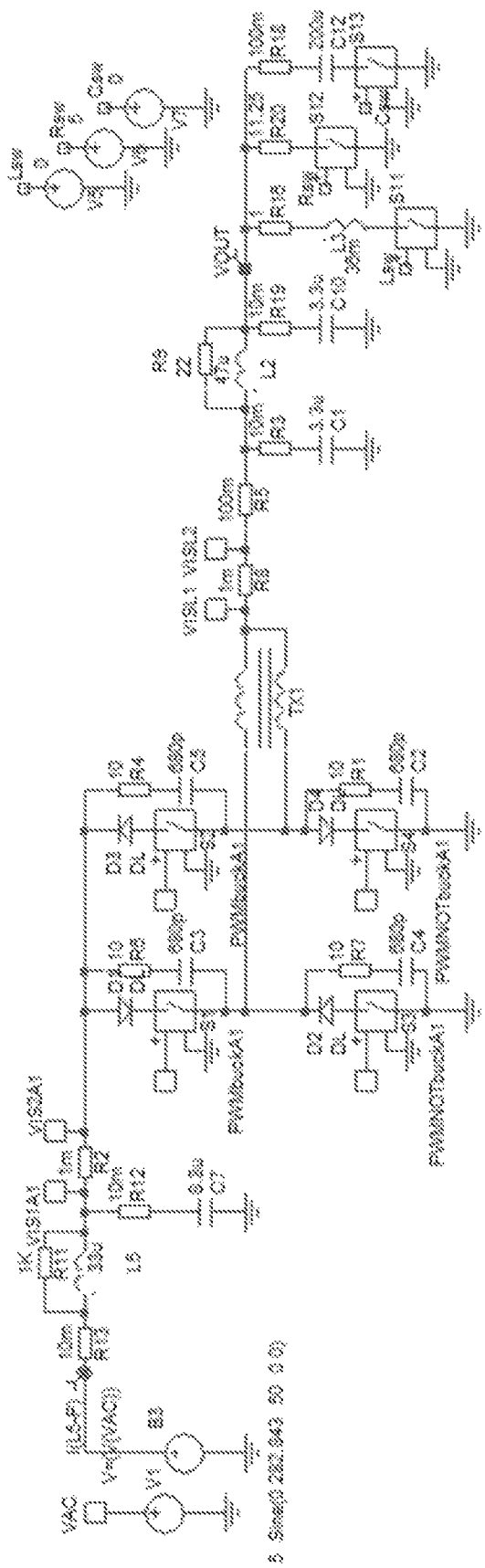
FIG. 5a depicts a detailed circuit diagram of an embodiment of the partial circuitry for input AC voltage decoupling and sensing, AC buck topology, load, and load stepping control of an improved HF AC series buck-boost voltage regulator in accordance to the present invention.
Figure 5B:
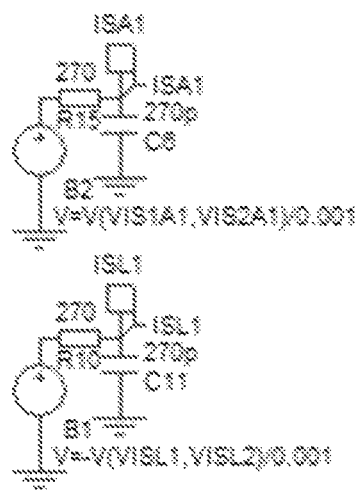
FIG. 5b depicts a detailed circuit diagram of an embodiment of the partial circuitry for PWM, and housekeeping of the improved HF AC series buck-boost voltage regulator.
Figure 5C:
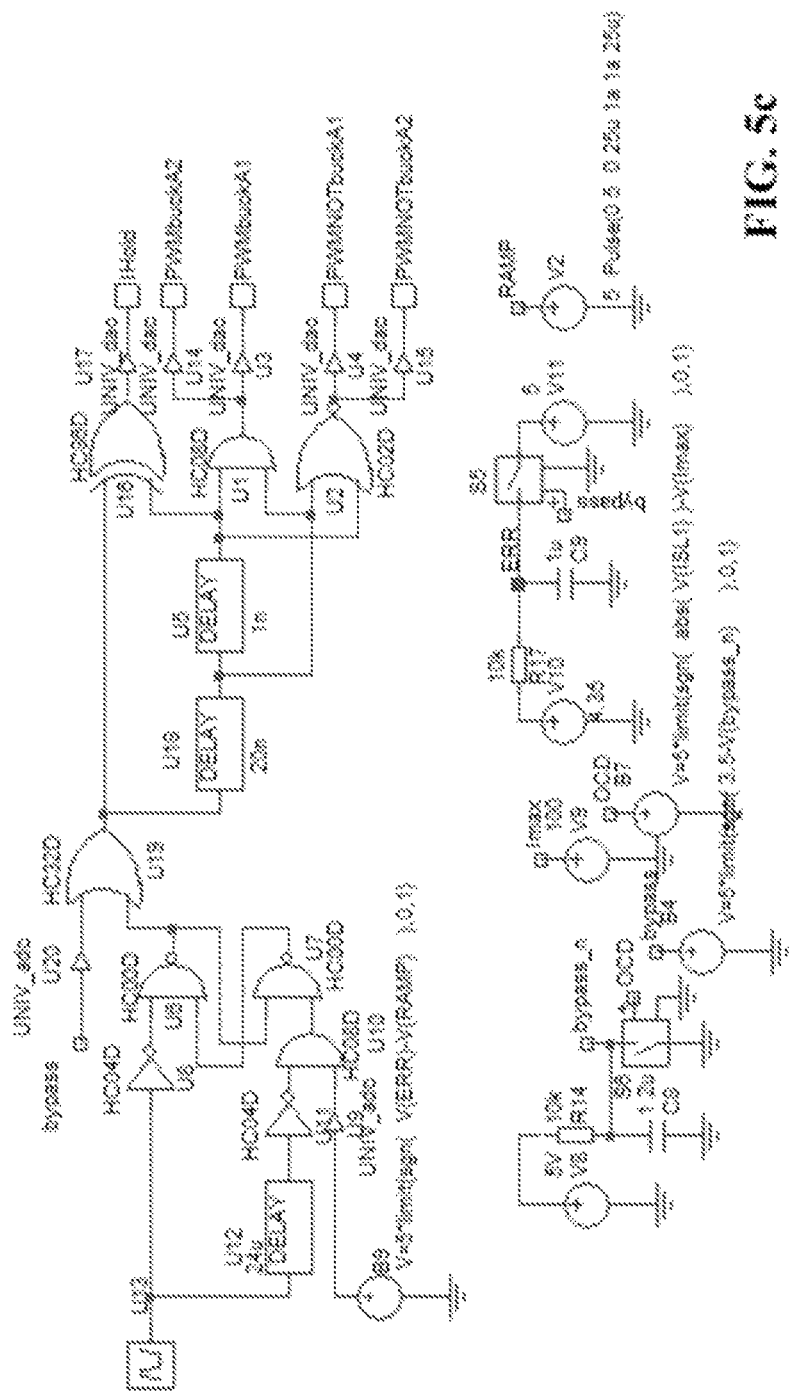
FIG. 5c depicts a detailed circuit diagram of an embodiment of the partial circuitry for current sensing of the improved HF AC series buck-boost voltage regulator.
Figure 5D:
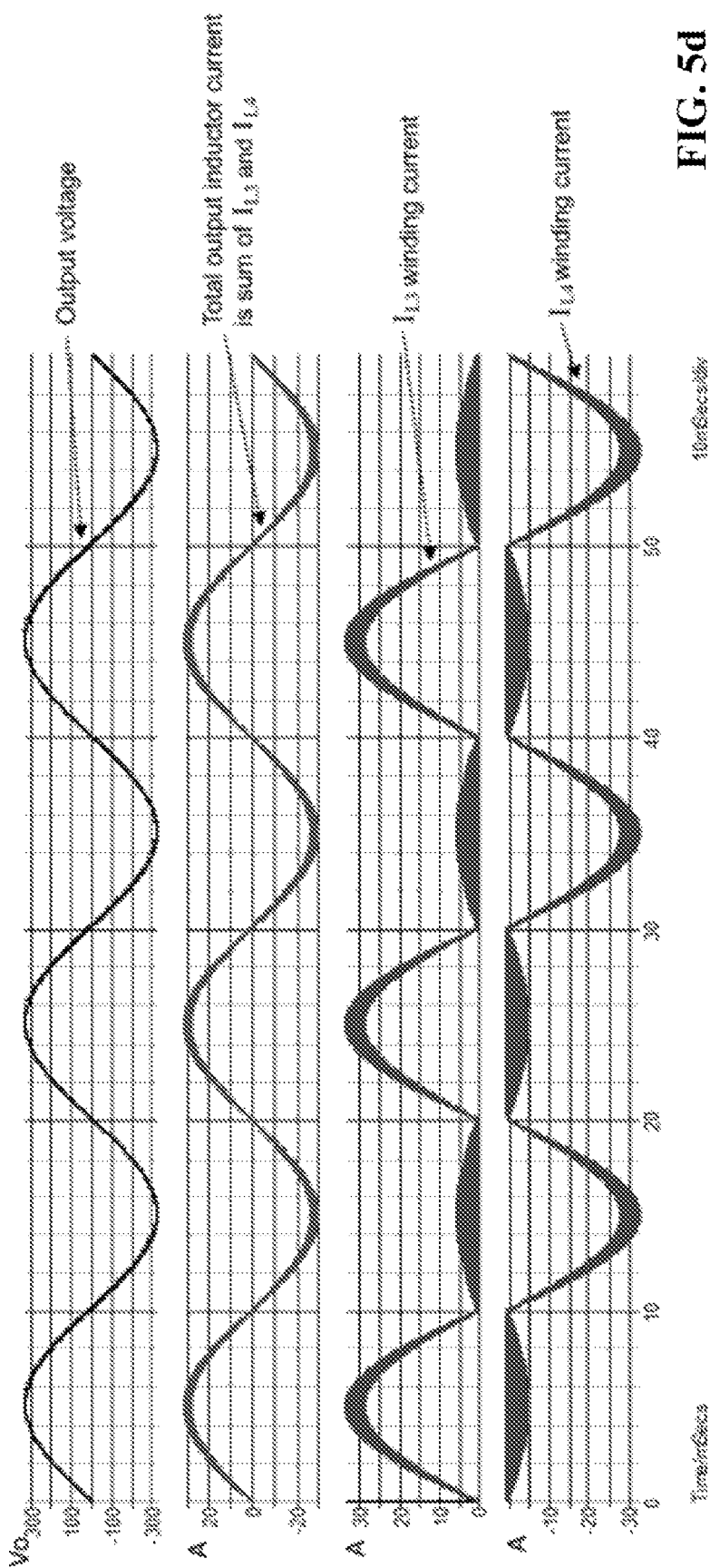
FIG. 5d shows the waveforms of the output voltage and current, the buck and boost winding currents of an exemplary embodiment (PWM 40 KHz, Vin=270 VAC RMS, Vout=232 VAC RMS, 50 Hz, Load=11.25 Ohm) of an improved HF AC series buck-boost voltage regulator in accordance to the present invention.

Referring to FIG. 4. Shown in FIG. 4 is an improved voltage regulator topology over the topology shown in FIG. 3. Instead of using unipolar switches connected as AC switches, the AC inductor current path in the buck and boost sections is split into two unipolar paths. In the buck section, the two unipolar paths are represented by two diode connected as half-bridge branches, each responsible for the conduction of unipolar current. In the topology shown in FIG. 4, Q1/D1, Q2/D2, and L3 conducts current from left to right; and at the same time, Q3/D3, Q4/D4, and L4 conducts current from right to left. Inductor L3 and L4 are coupled inductors having identical number of turns for symmetry reason. The total output current, having the waveform of a typical buck converter is the sum of currents of L3 and L4 branches. The voltage regulation, again take the buck section as example, is controlled by conventional PWM method. The AC output voltage is linearly proportional to the duty cycle of the forward switches Q1/D1 and Q3/D3. The two distinct switching states are the same as those of a conventional buck converter: (1) Forward state: Q1/D1 and Q3/D3 switch on, Q2/D2 and Q4/D4 switch off; (2) Freewheel state: Q1/D1 and Q3/D3 switch off, Q2/D2 and Q4/D4 switch on. A small turn-on timing overlay is provided during switching state transition from Forward to Freewheel and Freewheel to Forward to provide current continuity for the two inductor paths L3 and L4.

The AC output current is split into two unipolar paths as determined by the topology switch and diode directions. There is a small circulation current build-up in L3 and L4 paths, which is a small fraction of the full-load current and does not increase as the load current increases. The instantaneous ripple current direction reversal near output current zero-crossing is the sum of the circulation current ripple which is automatically handled by the topology. The amount of circulation current at specific operating voltage is a function of the PWM overlapping period and leakage inductance of the coupled inductors L3 and L4.

The AC coupled output current can be in any phase relationship relative to the input and output voltage. For this reason this AC regulator topology is capable of operating in all four possible quadrants of the AC voltage and current cycle. The topology can handle any power factor and bidirectional power flow without the need of an intermediate DC link.

Due to the inherent unipolar nature of individual switching branches. The diode series connected half-bridge branches are shoot-through proof. This topology does not require accurate voltage and current polarity sensing to operate, the simple PWM relationship makes this topology very robust to power line voltage and current perturbation. The use of current sensing points along L3, L4, L5, and L6 are for protection and housekeeping purpose.

The improved AC buck-boost voltage regulator employs lower loss unipolar switches in series with one rectifier. The power inductors, however, need to be treated separately. So in reference to FIG. 4, by making the unipolar semiconductor switching devices: Q1, Q2, Q3, Q4, Q5, Q6, Q7, and Q8 with series diodes: D1, D2, D3, D4, D5, D6, D7, and D8 respectively, the power inductors L3 and L4 in FIG. 3 can now be separated into power inductors L3 and L4 in the buck section, and L5 and L6 in the boost section as shown in FIG. 4.

For the input AC voltage, if the AC voltage input level is above the desired set AC reference level in the electronic control circuitry, then the buck section will reduce the voltage at each 40 microsecond point (25 KHz frequency as an example) on the LF frequency mains AC input voltage, typically at 50 hz or 60 Hz, or other frequencies, with Q1 and D1, and Q2 and D2 with HF power inductor L3 processing the positive AC half cycle; and Q3 and D3, and Q4 and D4 with power inductor L4 processing the negative AC half cycle.

Similarly, if the AC voltage input level is below the desired set AC reference level in the electronic control circuitry, then the boost section will increase the voltage at each 40 microsecond point (25 KHz frequency as an example) on the LF frequency mains AC input voltage, typically at 50 Hz or 60 Hz, or other frequencies, with Q5 and D5, and Q6 and D6 with HF power inductor L5 processing the positive AC half cycle, and Q7 and D7; and Q8 and D8 with inductor L6 processing the negative AC half cycle.

With the positive and negative half cycles processed separately in the buck or boost input AC voltage processing, the positive and negative half cycles are processed independently. Hence, there is also no destructive shoot-through by any of the unipolar low loss semiconductor switches, as each semiconductor switch is now a single unipolar semiconductor device in series with only one rectifier. Furthermore, this unipolar switch topology is able to accept a wide coupling coefficient variation of the coupled inductor pairs L3/L4 and L5/L6, ranging from close to unity to zero (uncoupled). With this flexibility, one can either wound two windings on the same inductor core to save space or separate the coupled inductor pairs into two individual inductors to minimize circulating current.

In the AC switch topology shown in FIG. 3, these bipolar AC semiconductor switches are typically created from a combination of unipolar semiconductor devices such as using an SCR, GTO, IGBT, or MOSFET inserted into a full rectifier bridge that adds additional rectifier power loss; or from using high loss AC bipolar devices such as TRIACS, back-to-back SCR's, or GTO's.

The present invention, on the other hand, has a number of advantages: a very robust buck-boost HF AC voltage regulator as there is no possibility of shoot-through, minimum and non-critical switching overlap timing for reducing peak currents, and the use of low loss unipolar semiconductor switches in series with one rectifier that reduces losses compared to a traditional single AC semiconductor switch. The analogue control circuitry, or preferably digital electronic control circuitry using DSP or microprocessor, is configured to handle all of the voltage sensing and control of the semiconductor switch timing. Since the destructive possibility of the semiconductor devices shoot-though is eliminated, the control circuitry is easier to implement with non-critical reference switch overlap timing. Therefore, the present invention presents a very robust improved HF AC voltage regulator.

The circuitries described in this document are simplified for demonstrating the basic principles of the present invention which utilizes unipolar semiconductor switches in series with one rectifier, and that the positive and negative cycles of the input AC voltage are processed separately with its own power inductor, either in a buck configuration for voltage decreasing, or boost configuration for a AC voltage increase. It should be obvious to any ordinarily skilled person in the art to be able to substitute the unipolar semiconductor switches in series with one rectifier, as shown in FIG. 4, with the one rectifier being an active rectifier, such as IGBT, FET, SCR, GTO's, or any of such devices in any configuration to achieve the same unipolar switching performance. Some configurations of the unipolar switching devices can be changed to facilitate the drive connections from the electronic control circuitry.

For example in FIG. 4, in reference to the unipolar semiconductor switching devices Q1 and Q2 each coupled with series rectifiers D1 and D2, the two unipolar switching semiconductor devices Q1 and Q2 can be connected to a common point at power inductor L3, with rectifiers D1 and D2 connected to the line, and ground, respectively. This or other similar configurations can be applied to each of the switching elements, but basically achieving the same effect, which is that of a unipolar switching semiconductor device in series with a rectifier. Additional rectifiers in series can be used, though the losses can be higher. Also, the buck AC voltage regulator section as shown in FIG. 4 can be used as a standalone series AC buck voltage regulator; and the boost AC voltage regulator as shown in FIG. 4 can be used as a standalone series AC boost voltage regulator. Any ordinarily skilled person in the art can apply the inventive principles described herein to any poly-phase AC systems, such as three-phase electrical systems, without departing from the scope and spirit of the invention.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An alternate current (AC) series voltage regulator for regulating an AC output voltage of an AC output power source, comprising:
    an AC high frequency (HF) series voltage buck power regulator topology for bucking an AC input voltage of an AC input power source, comprising:
        a first unipolar path, comprising:
            a first half-bridge, comprising a first and a second rectifier connected in series with a first and a second independently controllable unipolar switches respectively, and
            a first power inductor;
        a second unipolar path, comprising:
            a second half-bridge, comprising a third and a fourth rectifiers connected in series with a third and a fourth independently controllable unipolar switches respectively, and
            a second power inductor; and
    an AC HF series voltage boost power regulator topology for boosting the AC input voltage, comprising:
        a third unipolar path, comprising:
            a third half-bridge, comprising a fifth and a sixth rectifier connected in series with a fifth and a sixth independently controllable unipolar switch respectively, and
            a third power inductor;
        a fourth unipolar path, comprising:
            a forth half-bridge, comprising a seventh and an eighth rectifiers connected in series with a seventh and an eighth independently controllable unipolar switch respectively, and
            a fourth power inductor; and
    a control circuitry for receiving the AC input voltage, an AC reference voltage, and the AC output voltage, and generating switch driving signals for the unipolar switches;
    wherein positive and negative half cycles of the AC input voltage being processed separately and independently in either the AC HF series voltage boost power regulator topology or the AC HF series voltage buck power regulator topology at any one time eliminating any power "shoot-through".

2. The AC series voltage regulator of claim 1, wherein the first and second power inductors are coupled with a first pre-determined coupling coefficient, and wherein the third and fourth power inductors are coupled with a second pre-determined coupling coefficient.

3. The AC series voltage regulator of claim 1, wherein either the AC HF series voltage boost power regulator topology or the AC HF series voltage bucking power regulator topology are inactivated at any one time.

4. The AC series voltage regulator of claim 1, further comprising an input filter for eliminating HF switching energy from passing back into the AC input power source; wherein the input filter comprising two capacitors and two inductors.

5. The AC series voltage regulator of claim 1, further comprises an output filter for averaging HF voltage ripple to create a smooth regulated voltage level for the AC output voltage; wherein the output filter comprises two capacitors and two inductors.

6. The AC series voltage regulator of claim 1, further comprising a current transformer for generating an output current measurement signal to the control circuitry to achieve over-current protection.

7. The AC series voltage regulator of claim 1, wherein the switch driving signals for the unipolar switches being pulse width modulation (PWM) control signals.

8. The AC series voltage regulator of claim 1, wherein each of unipolar switches comprises one or more power semiconductor devices; and wherein the power semiconductor devices are unipolar MOSFET power semiconductor devices, silicon-controlled rectifiers (SCR)'s, gate turn off thyristor (GTO)'s, TRIAC's, insulated-gate bipolar transistors (IGBT)'s, or MOSFET transistors.

9. The AC series voltage regulator of claim 1, wherein at least one of the rectifiers is an active rectifier.

10. An alternate current (AC) series voltage regulator for regulating an AC output voltage of an AC output power source, comprising:
    an AC high frequency (HF) series voltage buck power regulator topology for bucking an AC input voltage of an AC input power source, comprising:
        a first unipolar path, comprising:
            a first half-bridge, comprising a first and a second unipolar switching device, and
            a first power inductor;
        a second unipolar path, comprising:
            a second half-bridge, comprising a third and a fourth unipolar switching device, and
            a second power inductor; and
    an AC HF series voltage boost power regulator topology for boosting the AC input voltage, comprising:
        a third unipolar path, comprising:
            a third half-bridge, comprising a fifth and a sixth unipolar switching device, and
            a third power inductor;
        a fourth unipolar path, comprising:
            a fourth half-bridge, comprising a seventh and an eighth unipolar switching device, and
            a fourth power inductor; and
    a control circuitry for receiving the AC input voltage, an AC reference voltage, and the AC output voltage, and generating switch driving signals for the unipolar switching devices;
    wherein positive and negative half cycles of AC input voltage are processed separately and independently in either the AC HF series voltage boost power regulator topology or the AC HF series voltage buck power regulator topology at any one time eliminating any power "shoot-through".

11. The AC series voltage regulator of claim 10, wherein at least one of the unipolar switching devices comprising one or more power semiconductor devices, and wherein the power semiconductor devices being unipolar MOSFET power semiconductor devices, silicon-controlled rectifiers (SCR)'s, gate turn off thyristor (GTO)'s, TRIAC's, insulated-gate bipolar transistors (IGBT)'s, or MOSFET transistors.

12. The AC series voltage regulator of claim 10, wherein the first and second power inductors are coupled with a first pre-determined coupling coefficient, and wherein the third and fourth power inductors are coupled with a second pre-determined coupling coefficient.

13. The AC series voltage regulator of claim 10, wherein either the AC HF series voltage boost power regulator topology or the AC HF series voltage bucking power regulator topology are inactivated at any one time.

14. The AC series voltage regulator of claim 10, further comprising an input filter for eliminating HF switching energy from passing back into the AC input power source; wherein the input filter comprises two capacitors and two inductors.

15. The AC series voltage regulator of claim 10, further comprising an output filter for averaging HF voltage ripple to create a smooth regulated voltage level for the AC output voltage; wherein the output filter comprises two capacitors and two inductors.

16. The AC series voltage regulator of claim 10, further comprising a current transformer for generating an output current measurement signal to the control circuitry to achieve over-current protection.

17. The AC series voltage regulator of claim 10, wherein the switch driving signals for the unipolar switching devices are pulse width modulation (PWM) control signals.

18. The AC series voltage regulator of claim 10, wherein at least one of the unipolar switching devices comprises an active rectifier.

* * * * *